United States Patent [19]

Östman

[11] Patent Number: 4,530,737
[45] Date of Patent: Jul. 23, 1985

[54] METHOD FOR USE IN RECOMPRESSION EVAPORATION OF A SOLUTION

[75] Inventor: Per H. Östman, Jorvas, Finland

[73] Assignee: Ekono Oy, Finland

[21] Appl. No.: 533,920

[22] Filed: Sep. 20, 1983

[30] Foreign Application Priority Data

Sep. 20, 1982 [FI] Finland .................................. 823230

[51] Int. Cl.³ .............................................. F26B 3/00
[52] U.S. Cl. .................................. 159/47.1; 159/47.3; 159/48.2
[58] Field of Search ...................... 159/46, 47.1, 47.3, 159/48.2, 29; 203/24, 26, 27, DIG. 4, DIG. 14

[56] References Cited

U.S. PATENT DOCUMENTS

| 2,822,038 | 2/1958 | Kennedy et al. | 159/47.3 |
| 3,290,153 | 12/1966 | Bayne et al. | 159/46 |
| 3,396,086 | 8/1968 | Starmer | 203/26 |
| 3,463,216 | 8/1969 | Miles | 159/46 |
| 3,475,281 | 10/1969 | Rosenblad . | |
| 3,514,375 | 5/1970 | Dambrine | 159/46 |
| 3,635,790 | 1/1972 | Heath | 159/47.3 |
| 3,661,778 | 5/1972 | Pradt | 159/46 |
| 4,137,129 | 1/1979 | Bjorklund | 203/26 |
| 4,284,480 | 8/1981 | Sterlini | 203/26 |
| 4,303,468 | 12/1981 | Lagvilharre et al. | 203/26 |

FOREIGN PATENT DOCUMENTS 669928  4/1952  United Kingdom .................. 159/29

Primary Examiner—Peter Kratz
Attorney, Agent, or Firm—Klarquist, Sparkman, Campbell, Leigh & Whinston

[57] ABSTRACT

The invention relates to a method for evaporation of a solution in a recompression evaporation plant. The solution is evaporated first in known manner by indirect transfer of heat from the recompressed vapor through condensation of said vapor in one or more evaporation units. After pre-evaporation in this fashion the solution is finally evaporated by direct transfer of heat from the overheated vapor which is obtained by recompression of the vapor formed in evaporation. According to the invention this final evaporation is achieved by mixing the solution in finely-divided form with the overheated vapor and then after thermodynamic equilibrium between the vapor and liquid phases has been substantially attained separating the solution from the vapor. The solution thereby obtained can be further evaporated without the addition of heat but with a reduction of pressure by means of conducting it to an expansion vessel which is connected by a vapor line to the suction line of the compressor.

3 Claims, 3 Drawing Figures

METHOD FOR USE IN RECOMPRESSION EVAPORATION OF A SOLUTION

BACKGROUND OF THE INVENTION

The present invention relates to a method for evaporation of a solution using a recompression evaporation plant which consists of one or more evaporation units and possibly also apparatus for distillation of said solution or other liquid.

The object of the present invention is to raise the dry solid content attained in recompression evaporation of a solution considerably higher than has been practically possible heretofore and to do so without on that account increasing the energy requirement of said recompression evaporation.

The concentration of solutions by evaporation is carried out extensively within various industries. In e.g. the chemical woodpulp industry large quantities of waste liquor from the digestion process are evaporated. The evaporated liquor is then burned in a furnace where steam is produced and from which the inorganic chemicals present in the liquor are recovered for the production of fresh digesting chemicals. At the present time the so-called multi-stage evaporator is the most commonly used type of evaporation plant.

During recent years the price of fuel has risen very rapidly and significantly more rapidly than the price of electricity. As a consequence the other principal type of evaporation plant, viz. the recompression evaporator, has in many cases become significantly more economic than multi-stage evaporation.

In both said principal types of evaporation plant the heat required for vaporization of the solvent (generally water) is transferred to the solution by means of a heating surface. The solution to be evaporated flows on one side of said heating surface and a vapour with a condensation temperature which is higher than the temperature of the solution is condensed on the other side of said heating surface.

The viscosity of a solution generally increases considerably when the solution is concentrated by evaporation. When the viscosity of the solution increases the heat transfer is reduced so that a larger heating surface and/or a larger temperature difference between the condensed vapour and the solution is required.

Moreover, when a solution is evaporated to a high concentration there is often precipitation of inorganic and/or organic material which to a considerable extent fastens to the heating surface in the form of incrustations thereby causing a further deterioration in the heat transfer and making it necessary to clean the evaporation unit concerned at regular intervals.

The elevation of the boiling point of a solution, i.e. the difference between the temperature of the boiling solution and the condensation temperature of the vapour produced, also increases with increasing concentration.

As a consequence of these physical phenomena both the capital costs and the running costs calculated per quantity of solvent evaporated increase rapidly the more concentrated the solution to be evaporated becomes. Because of this the economic and practical limit in the evaporation of e.g. black liquor is at present a final concentration of approx. 65% dry solids content, although from the point of view of combustion and heat economy it would be desirable to carry the evaporation considerably further. The evaporation of black liquor above approx. 60% dry solids content normally also requires so-called forced-circulation evaporation units which are more expensive in terms of both capital and running costs than e.g. Kestner units which can be used for evaporation up to approx. 60% dry solids content.

In U.S. Pat. No. 3,475,281 a recompression evaporation plant for a solution is described in which the liquid is evaporated in two stages of which the first stage is equipped with a recompression unit in order to compress mechanically the vapours from the first evaporation stage and return said vapours with an excess of heat as an indirect heating medium for the evaporation of further solution in said first stage, the surplus vapour from the first stage being used for the evaporation of solution in the second stage.

In a recompression evaporation plant, however, the compressed vapour becomes considerably overheated. It is well-known that with the condensation of an overheated vapour the transfer of heat is slower than with a saturated vapour if the degree of overheating is appreciable. Accordingly in recompression evaporation plants the overheating of the vapour is usually removed by wetting the vapour with condensate before it is led to the evaporation unit for condensation.

The present invention aims to reduce the difficulties which arise as a result of high viscosity, elevation of boiling point and formation of incrustations in the evaporation to high concentration of solutions such as e.g. black liquor.

SUMMARY OF THE INVENTION

According to the invention the solution is concentrated first by evaporation in known manner in a recompression evaporation plant in which the heat required for evaporation is supplied to the solution indirectly by a heating surface through condensation of vapour on the heating surface in one or more evaporation units. This vapour consists of the vapour which is principally formed by evaporation of the solution in the aforesaid evaporation units, but the temperature and pressure of which is increased by compression in order to obtain the temperature difference required to effect the transfer of heat across the heating surface. This compression, however, causes the vapour to become greatly overheated, i.e. its temperature increases considerably more than its saturation temperature (condensation temperature). The lower the efficiency of the compressor the greater the proportional difference between these temperature increases is. With an efficiency of 70%, which is a normal value for a good centrifugal compressor, the increase in the temperature of the vapour is approx. 4.6 times the increase in the saturation temperature of the vapour. If e.g. saturated steam at 100° C. is compressed to such an extent that its condensation temperature increases to 124° C., then its temperature will increase to 210° C.

In accordance with the present invention this overheating of the compressed vapour is utilized for the final evaporation of the solution which has been pre-evaporated in the manner described above. This evaporation is achieved by mixing the solution in finely-divided form with the overheated vapour, upon which there takes place an exchange of heat and material between the solution and the vapour. At thermodynamic equilibrium the temperature of the solution is the same as the temperature of the vapour and exceeds the condensation temperature of the vapour to the extent to which the boiling point of the solution is elevated after the solution has been evaporated in this manner. Because of the large contact area between the solution and the vapour the mixture rapidly approaches thermodynamic equilibrium. This direct evaporation accordingly takes place very rapidly so that the solution can be separated from the vapour after a short contact time.

After this separation the overheating of the vapour is somewhat greater than the elevation of the boiling point of the evaporated solution. This overheating can be removed in known manner by wetting the vapour with condensate before the vapour is led to the evaporation units.

During this direct evaporation the temperature and vapour pressure of the solution increase. The solution can therefore be further evaporated without the addition of heat by means of leading it to an expansion vessel which by means of a steam line is connected to e.g. the suction line of the compressor.

The method according to the invention provides several advantages:
1. Because the final evaporation of the solution is carried out using heat transferred directly from overheated vapour and by subsequent expansion of the solution the problem of incrustation of the heating surfaces is eliminated. By application of the present method the solution can accordingly be evaporated to a higher final concentration than would be economically and practically possible with prior-known technology.
2. Because the potential of the overheated vapour is utilized in the final evaporation to heat up and partially vaporize the liquid, said final evaporation takes place without the addition of extra energy. In prior-known technology this potential for the evaporation of the solution is not utilized but goes to waste when the overheated vapour condenses in the evaporation units or when it is wetted with condensate.
3. The equipment required is simple and consists of:
   (a) A pump and nozzle or other arrangement for finely dividing the solution and mixing it with the overheated vapour.
   (b) A cyclone or other arrangement for re-separation of the solution from the vapour.
   (c) An expansion vessel for the expansion evaporation of the hot solution.

DETAILED DESCRIPTION

Figure 1:
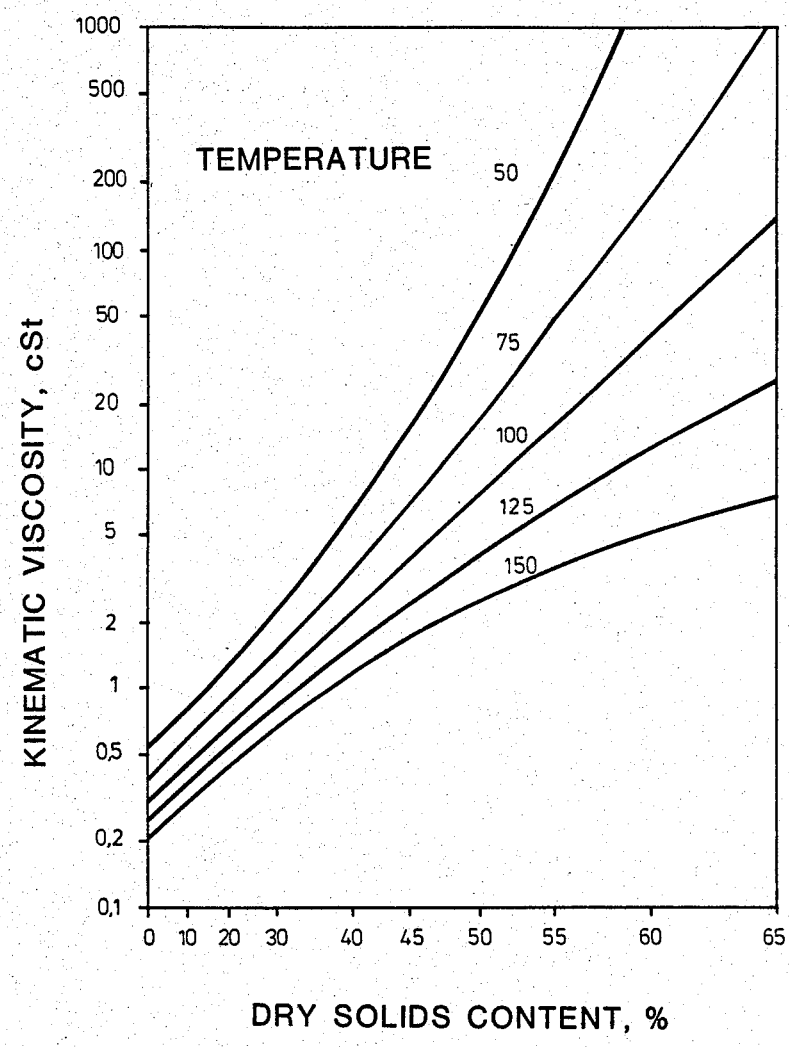
FIG. 1 is a diagram which shows how the viscosity of a typical waste liquor from a sulphate pulp process (socalled black liquor) depends on the dry solids content and temperature of the waste liquor.
Figure 2:
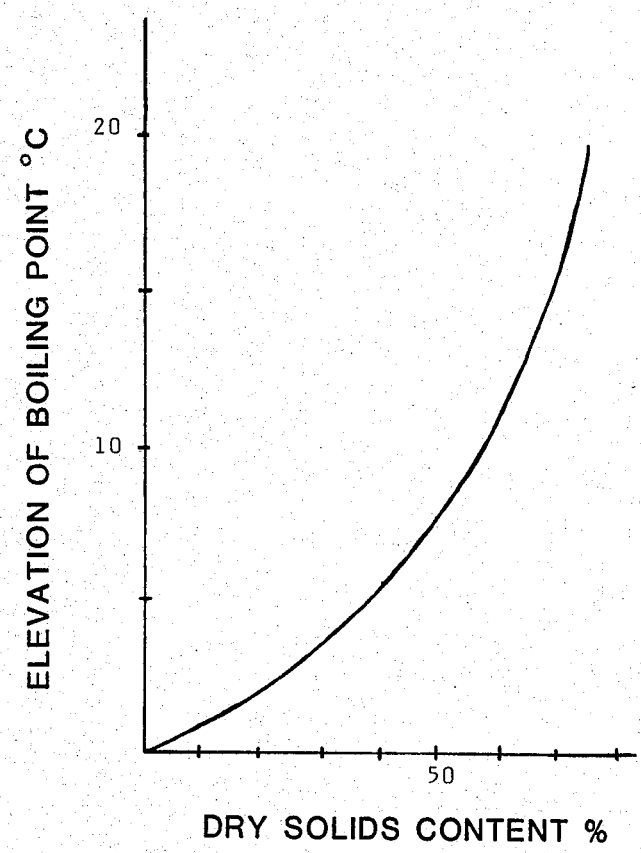
FIG. 2 is a diagram which shows the dependence of the elevation of the boiling point (°C.) on the dry solids content (%) for a typical black liquor.
Figure 3:
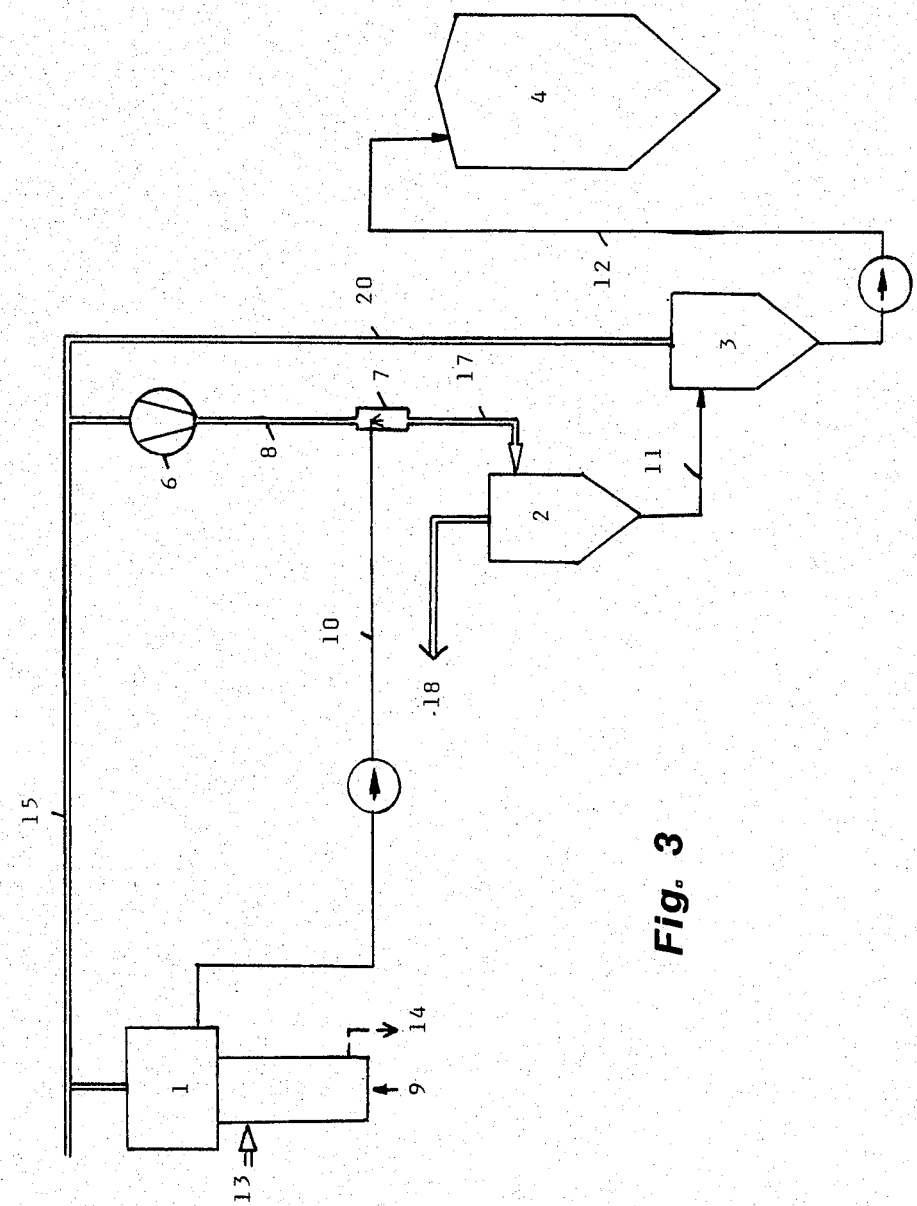
FIG. 3 is a simplified flow diagram of the outlet end of a recompression evaporation plant which has been modified so as to employ the method according to the invention.

In FIG. 3 the number 1 denotes the final evaporation unit in a recompression evaporation plant consisting of one or more units. The evaporation unit 1 is provided with an inlet line 9 for the solution and an outlet line 10 for the solution which has been evaporated in the unit 1. Heat is indirectly transferred to the solution in the evaporation stage 1 by means of vapour 13 from the recompression apparatus or from some preceding evaporation stage. The condensate is removed from the evaporation unit 1 via the line 14. The vapour given off by the solution as a result of the indirect transfer of heat is conducted away from the evaporation unit 1 by the pipe line 15.

The number 4 denotes a storage tank for the solution which has been concentrated, and the number 6 denotes a recompression apparatus for compression of the vapour from the final evaporation stage 1 and possibly also from other evaporation units. Normally the recompression apparatus (6) is of a "mechanical" nature, e.g. a centrifugal compressor or several centrifugal compressors connected in series, but can also be of a "thermal" nature, i.e. an ejector or several ejectors connected in series with steam at a higher pressure as the driving medium.

In contradistinction to prior-known recompression evaporation units the concentrated solution which is removed from the final evaporation unit 1 via the pipeline 10 is not led directly to the storage tank 4. The liquid in the pipeline 10 is instead first led to a nozzle 7 where it is finely divided and mixed with the compressed and overheated vapour from the recompression apparatus 6, which is connected by means of pipeline 8 to the nozzle 7, after which the mixture is led via pipeline 17 from the nozzle 7 to a cyclone 2 for re-separation of the further concentrated solution from the cooled vapour which is led further via pipeline 18 to one or more evaporation units, e.g. the evaporation unit 1 via pipeline 13. The further concentrated liquid is led from the cyclone 2 via pipeline 11 to an expansion vessel 3 for expansion evaporation of the hot concentrated solution, which is finally led via pipeline 12 to the storage tank 4. The vapour given off in the expansion evaporation in the expansion vessel 3 is led off via pipeline 20 which is directly or indirectly connected to the suction line 15 of the recompression apparatus.

EXAMPLE

The extent of the increase in the final concentration to which a solution can be evaporated by use of the invention in comparison to prior-known technology is dependent on a number of factors such as, for example, the type of solution, the initial and final concentrations of the solution, and the connection and dimensions of the recompression evaporation plant.

The black liquor from a sulphate pulp process is evaporated from an initial concentration of 15% to a concentration of 65% by indirect transfer of heat in the evaporation units of a recompression plant. The 65% black liquor could then be finally evaporated to 75% with the arrangement shown in FIG. 3 by the direct transfer of heat from the overheated recompressed steam. For a sulphate pulp mill producing 1000 t pulp/day the saving in energy with this method would be 210 000 GJ p.a. which is equivalent to $900,000 per year at an oil price of $175 per ton.

What is claimed is:
1. A method for concentrating a solution using a recompression evaporation plant comprising at least one evaporation unit, the method comprising:
   evaporating liquid from and thus concentrating the solution in the evaporation unit;
   mixing the concentrated solution directly with overheated vapour obtained from the recompression evaporation plant, the vapour being sufficiently heated to further vaporize liquid from and thus further concentrate said solution; and separating the further concentrated solution from the vapours.

2. The method according to claim 1, in which the heated and separated solution is subjected to expansion vaporization for further evaporation.

3. The method according to claim 2, in which the vapour from the expansion vaporization of the solution is recompressed and cooled with the first mentioned concentrated solution.

* * * * *